United States Patent [19]
Shoji et al.

[11] Patent Number: 5,303,595
[45] Date of Patent: Apr. 19, 1994

[54] PRESSURE SENSOR UTILIZING MAGNETOSTRICTION EFFECT

[75] Inventors: Rihito Shoji, Yawata; Hiroyuki Hase, Kyoto; Masayuki Wakamiya, Suita, all of Japan

[73] Assignee: Matsushita Electric Industrial Co., Ltd., Osaka, Japan

[21] Appl. No.: 789,333

[22] Filed: Nov. 8, 1991

[30] Foreign Application Priority Data

Nov. 19, 1990 [JP] Japan .................................. 2-313520

[51] Int. Cl.⁵ .............................................. G01L 9/16
[52] U.S. Cl. .................................. 73/728; 73/DIG. 2; 336/30
[58] Field of Search .................. 73/728, 722, DIG. 2, 73/779, 862.69; 336/30

[56] References Cited

U.S. PATENT DOCUMENTS 4,938,069  7/1990  Shoji et al. .............................. 73/728
5,165,284  11/1992  Shoji et al. .............................. 73/728

Primary Examiner—Donald O. Woodril
Attorney, Agent, or Firm—Stevens, Davis, Miller & Mosher

[57] ABSTRACT

A pressure sensor in which a magnetostriction effect of an amorphous magnetic alloy is utilized. It is an object of the invention to suppress the thermal sensitivity change of the pressure sensor and to improve the lineality and the hysteresis of sensor output. The pressure sensor comprises a cylindrical columnar hollow body with a pressure introducing opening, a deforming part of which body is distorted by a pressure introduced from the pressure introducing opening, the deforming part being a peripheral wall of the body, and a thin film made of an amorphous magnetic alloy having a magnetostriction property which is fitted around and bonded to the deforming part, wherein the film, which is curved to have a cylindrical shape and annealed before it is provided around the cylindrical columnar deforming part, has a curvature different from a curvature of the cylindrical columnar deforming part.

4 Claims, 1 Drawing Sheet

PRESSURE SENSOR UTILIZING MAGNETOSTRICTION EFFECT

FIELD OF THE INVENTION

The present invention relates to a pressure sensor in which a magnetostriction effect of an amorphous magnetic alloy is utilized.

DESCRIPTION OF THE PRIOR ART

The magnetostriction effect of an amorphous magnetic alloy can be suitably utilized in a pressure sensor.

A conventional pressure sensor comprises a hollow cylindrical body made of titanium and having a partition wall to divide its hollow portion into two chambers. One of the two chambers is a pressure chamber and has a pressure introducing opening to introduce the pressure to be sensed, while the other chamber is a dummy chamber. Around the hollow cylindrical body is a thin film made of an amorphous magnetic alloy. When pressure is introduced into the pressure chamber, the walls of the pressure chamber deform to an extent that depends on the magnitude of the pressure, while the walls of the dummy chamber do not. This deformation causes a deformation of the part of the thin film that surrounds the pressure chamber, while the part of the thin film that surrounds the dummy chamber is unaffected. The deformation of the thin film causes a difference in permeability between the parts of the thin film that surround the pressure chamber and the dummy chamber. This difference in permeability can be detected by magnetic coils that surround the two parts of the thin film.

The sensitivity of such a pressure sensor inevitably varies according to the temperature. An actual measurement resulted in a change of $-40\%$ at a temperature of $+100°$ C. when the reference temperature was $-30°$ C. Besides, the lineality and the hysteresis of sensor output were unfavorably 16% and 6%, respectively.

SUMMARY OF THE INVENTION

It is therefore an object of the present invention to suppress the thermal sensitivity change of the pressure sensor of the above-mentioned type and to improve the lineality and the hysteresis of sensor output.

According to one aspect of the invention, a thin film made of an amorphous magnetic alloy is curved to have a shape fitted to the outer periphery of a cylindrical columnar hollow body, and is annealed in this state before it is provided around the body. Besides, its curvature is different from that of the cylindrical columnar body. Therefore, if the curvature of the film before it is mounted around the body is larger than that of the body, that is to say, if the inner diameter of the film is smaller than the outer diameter of the body, tensile stress remains on the inner peripheral surface of the film, and compressive stress remains on the outer peripheral surface of the same after it is fitted around the body. Also, if the curvature of the film before it is mounted around the body is smaller than that of the body, that is to say, if the inner diameter of the film is larger than the outer diameter of the body, compressive stress remains on the inner peripheral surface of the film, and tensile stress remains on the outer peripheral surface of the same after it is fitted around the body.

Thus, bias strain is generated in the film of the amorphous magnetic alloy provided around the body, and characteristics such as thermal sensitivity change, so lineality and hysteresis can be improved by use of this film.

In order to set and bond the film of the amorphous magnetic alloy around the body, it is usually curved to have a shape fitted to the outer periphery of the body, and is annealed as it is (an example of annealing conditions: vacuum, 430° C., 20 minutes) before it is mounted around the body. Conventionally, the curvature of a thin film made of an amorphous magnetic alloy before it is provided around a cylindrical columnar body has been made substantially equal to the curvature of the body. Consequently, in the prior art pressure sensor, bias strain is not generated in the film fitted around the body while it is not operating the measurement. Taking this matter into account, the inventors of the present application have intended the above-described method.

Other features and advantages of the invention will be more apparent in the following descriptions with reference to FIGS. 1 and 2.

DETAILED DESCRIPTION OF THE INVENTION

Figure 1:
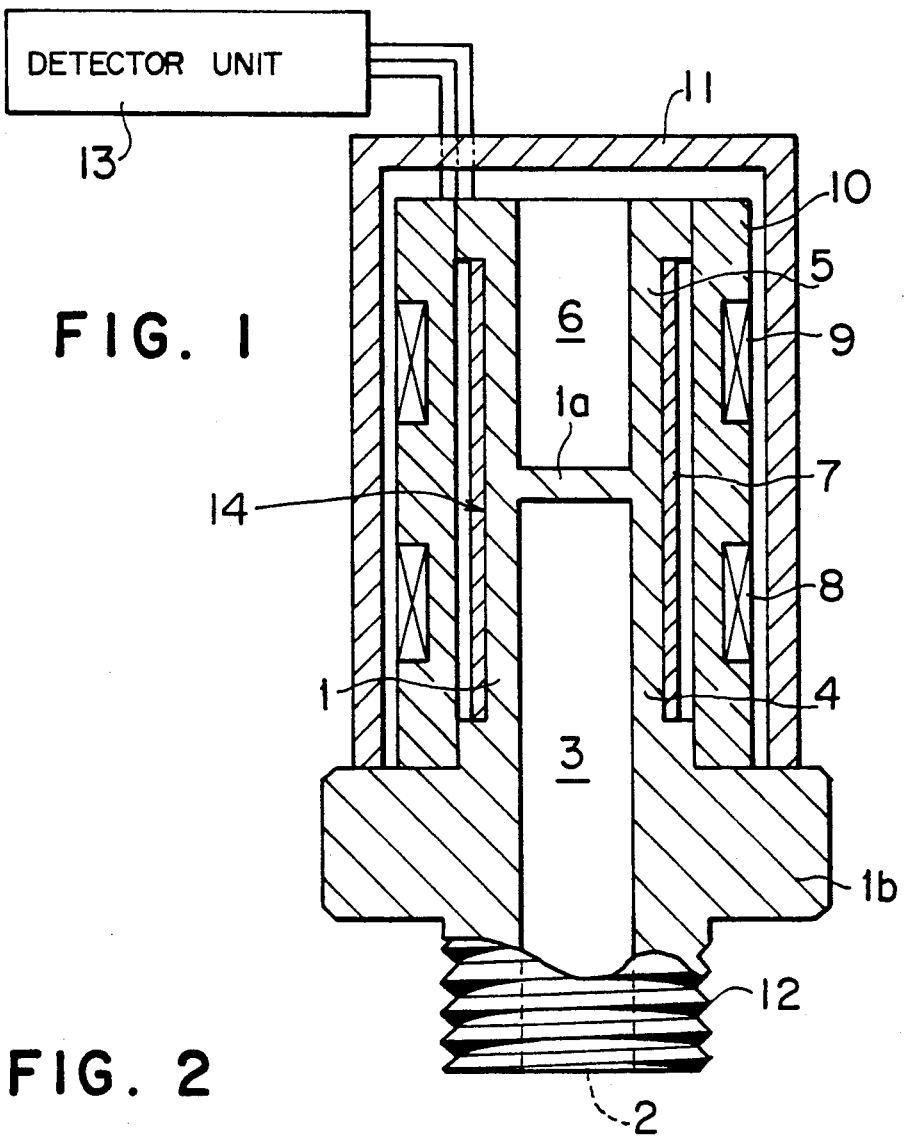
FIG. 1 is a vertical cross-sectional view of a pressure sensor with a thin film made of an amorphous magnetic alloy according to one embodiment of the present invention.

FIG. 1 is a view for illustrating a pressure sensor of the present invention. This pressure sensor comprises a cylindrical columnar hollow body 1 made of titanium (having a wall thickness of 2 mm, an outer diameter of 10 mm, and a height of 70 mm), a thin film 7 made of an amorphous magnetic alloy which covers the outer periphery of the body 1, a cylindrical hollow bobbin 10 made of a phenolic resin which encloses the film 7 to cover further the outer periphery of the body 1, a pressure detector coil 8 wound on the outer periphery of the bobbin 10, a dummy coil 9 similarly wound on the outer periphery of the bobbin 10, a yoke 11 (48% Ni—Fe alloy) disposed outside of the coils 8 and 9, and a detector unit 13 conductively connected to both of the coils 8 and 9.

The body 1 includes two central holes separated from each other by a partition wall 1a, i.e., a pressure chamber 3 and a dummy chamber 6 having substantially the same diameter as the pressure chamber 3, a pressure introducing opening 2 (having an inner diameter of 6 mm) defined by an open end of the pressure chamber 3, a greater-diameter flange 1b extending in the vicinity of the end of the body 1 where the pressure introducing opening 2 is located, a recess (smallest-diameter portion) 14 formed in the outer periphery of the body 1 and extending throughout the entire length of a smaller-diameter portion of the body 1 between the other end of the body 1 remote from the pressure introducing opening 2 and the greater-diameter flange 1b, and a threaded portion 12 for screw-fastening (pitch: PF3/8) formed on the outer periphery of the end portion of the body 1 close to the pressure introducing opening 2. A wall part which defines a portion of the pressure chamber 3 and exists between the pressure chamber 3 and the recess 14 is a deforming part 4 which deforms depending upon a magnitude of internal pressure of the pressure chamber 3. On the other hand, another wall part which defines a portion of the dummy chamber 6 and exists between the dummy chamber 6 and the recess 14 is a non-deforming part 5 which will not be affected by the internal pressure of the pressure chamber 3. The film 7 is a thin sheet of an amorphous magnetic alloy which is provided around the outer periphery of the body 1 within the recess 14 and securely bonded thereto by use of an imide system adhesive under the bonding condition of a temperture of 180° C for two hours. The composition of the amorphous magnetic alloy is $(Fe_{95}Cr_5)_{79}Si_{12.5}B_{8.5}$.

The pressure detector coil 8 is received in one peripheral groove of the bobbin 10 in the vicinity of the flange 1b, and the dummy coil 9 is received in the other peripheral groove of the bobbin 10. Both of the coils 8 and 9 are used as permeability detector elements, and they constitute a magnetic circuit together with the film 7 made of the amorphous magnetic alloy.

A pressure to be measured is transmitted from the pressure introducing opening 2 to the pressure chamber 3, and such a force as to enlarge the volume of the pressure chamber 3 is exerted on the deforming part 4 which is the wall part of the body 1. When the deforming part 4 deforms, the film 7 bonded to the surface thereof also forms, causing a change in the permeability. This permeability change is detected as a change in the inductance by the pressure detector coil 8, and a pressure change is obtained from a differential output between the coil 8 and the dummy coil 9.

Figure 2:
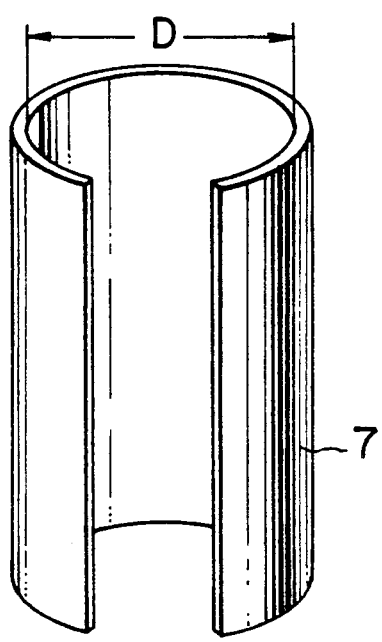
FIG. 2 is a perspective view of the film, which is curved to have a cylindrical shape, before it is fitted around a cylindrical columnar body of the pressure sensor.

FIG. 2 illustrates a thin film 7 made of an amorphous magnetic alloy before it is provided around the periphery of the body shown in FIG. 1. The film 7 is bent to have a cylindrical shape, as shown in the drawing, and annealed in this state. The cylindrically bent film 7 has an inner diameter D different from an outer diameter of the recess 14. It should be noted that, in this embodiment, both peripheral ends of the cylindrically bent film 7 are not in contact with each other so that the film 7 is not completely cylindrical. However, it may be shaped as a complete cylinder. When the film 7 shown in FIG. 2 is provided around the outer periphery of the recess 14, a difference between the inner diameter D of the film 7 after annealed and the outer diameter of the body 1 brings the following results. If the inner diameter of the film 7 is smaller than the outer diameter of the recess 14, tensile stress remains on the inner peripheral surface of the film 7, and compressive stress remains on the outer peripheral surface of the same after it is filled around the body 1. Also, if the inner diameter of the film 7 is larger than the outer diameter of the body 1, compressive stress remains on the inner peripheral surface of the film 7, and tensile stress remains on the outer peripheral surface of the same after it is fitted around the body 1.

EXAMPLE

Characteristics of sensor outputs were examined, using the film 7 made of the amorphous magnetic alloy expressed by $F_{95}Cr_5)_{79}Si_{12.5}B_{8.5}$ having a thickness of 0.03 mm and various inner diameters (D). Table 1 shows experimental values of changes in the characteristics of sensor output owing to differences of the inner diameter D after annealed.

TABLE 1

Relationship between inner diameters of film after annealed and characteristics of sensor output

| Inner diameter of film after annealed (mm) | Thermal sensitivity change* (%) | Lineality (%) | Hysteresis (%) |
|---|---|---|---|
| 7 | 56 | 3 | 1 |
| 8 | 13 | 1 | 1 |
| 9 | −5 | 5 | 3 |
| 10 | −40 | 16 | 6 |
| 11 | −8 | 4 | 3 |
| 12 | 10 | 1 | 1 |
| 13 | 43 | 2 | 1 |

*Note:
A thermal sensitivity change is a pressure change ratio obtained by setting a pressure measured at a temperature of −30° C. as a reference value and measuring the pressure at a temperature of 100° C.

In Table 1, a sample having an inner diameter (D) of 10 mm after annealed is a conventional example. Samples whose inner diameters (D) after annealed were more than or less than 10 mm were improved in the lineality and the hysteresis. Also, samples having the inner diameters D of 8, 9, 11 and 12 mm, i.e., within a range of 80–90% or 110–120% of the outer diameter (10 mm) of the recess 14, were remarkably improved in the thermal sensitivity change.

According to the present invention, as clearly understood from the above description, there can be provided a pressure sensor having a small thermal sensitivity change and excellent in the lineality and the hysteresis.

What is claimed is:

1. A pressure sensor comprising a cylindrical columnar hollow body with a pressure introducing opening, a deforming part of which body is distorted by a pressure introduced from said pressure introducing opening, said deforming part being a peripheral wall of said body, and a thin film made of an amorphous magnetic alloy having a magnetostriction property which is fitted around and bonded to said deforming part, wherein:
    said film is curved to have a cylindrical shape and annealed to have a curvature different from a curvature of said cylindrical deforming part before it is provided around said cylindrical columnar deforming part.
2. A pressure sensor according to claim 1, wherein said cylindrical columnar hollow body is made of titanium, said film being formed of an amorphous magnetic alloy whose composition is $(Fe_{95}Cr_5)_{79}Si_{12.5}B_{8.5}$.
3. A pressure sensor according to claim 1, wherein said film, which is curved to have a cylindrical shape and annealed before it is provided around said cylindrical columnar deforming part, has an inner diameter different from an outer diameter of said cylindrical columnar deforming part and within a range of 80–90% or 110–120% of said outer diameter.
4. A pressure sensor according to claim 1, wherein said film has a tensile stress on an inner peripheral surface and a compressive stress on an outer peripheral surface after it is provided around said cylindrical columnar deforming part.

* * * * *